United States Patent [19]

Diman et al.

[11] Patent Number: 4,898,667
[45] Date of Patent: Feb. 6, 1990

[54] POINT-OF-USE MEMBRANE FILTRATION SYSTEM

[75] Inventors: Charles Diman, Billerica; David Marcus, Newton; Philip Mitchell, East Walpole; Samuel B. Sachs, Brookline, all of Mass.

[73] Assignee: The Kendall Company, Boston, Mass.

[21] Appl. No.: 167,658

[22] Filed: Mar. 14, 1988

[51] Int. Cl.⁴ .................. B01D 21/30; B01D 27/00
[52] U.S. Cl. ................................. 210/138; 210/167
[58] Field of Search .................. 210/143, 138–142, 210/96.2, 98, 167, 194, 416.1, 418–420, 422–424, 428, DIG. 13

[56] References Cited

U.S. PATENT DOCUMENTS

| | | |
|---|---|---|
| 3,774,763 | 11/1973 | Yall et al. |
| 3,870,033 | 3/1975 | Faylor et al. |
| 4,160,727 | 7/1979 | Harris, Jr. |
| 4,246,101 | 1/1981 | Selby ............................ 210/143 |
| 4,276,177 | 6/1981 | Smith |
| 4,280,912 | 7/1981 | Berry, III et al. |
| 4,610,790 | 9/1986 | Reti et al. |
| 4,622,133 | 11/1986 | Furuno |
| 4,648,978 | 3/1987 | Makinen et al. |
| 4,655,909 | 4/1987 | Furuno |
| 4,770,769 | 9/1988 | Schael ........................ 210/96.2 |

Primary Examiner—Frank Sever
Attorney, Agent, or Firm—Alvin Isaacs

[57] ABSTRACT

A point-of-use membrane filtration system and method for water or other liquids including an automatic control system for purge, rinse-up, sanitization, or combinations thereof. The system may be used for microfiltration, ultrafiltration or hyperfiltration (reverse osmosis) depending on the membrane pore size of the filtration cartridge employed in the system. A reject valve at the bottom of the filter cartridge is automatically opened when filtered product is drawn, thus to direct some water and any waste to drain. The control system is programmed to accomplish purge, rinse-up and sanitization procedures at predetermined intervals with predetermined combinations of procedures.

16 Claims, 3 Drawing Sheets

4,898,667

POINT-OF-USE MEMBRANE FILTRATION SYSTEM

BACKGROUND OF THE INVENTION

This invention relates to point-of-use purification systems and, more particularly, to an automatic control system with a water purification system. Preferably, the system is a point-of-use ultrafiltration system including controls for purge, rinse-up and purge, or sanitization, rinse-up and purge.

Point-of-use systems overcome the contamination problems encountered because of internal piping contamination occurring in installations having a central processing facility with piping from the facility to the point of use. The degree of filtration accomplished by the present invention is dependent upon the pore size of the membrane of the filtration cartridge employed with the invention. Ultrafiltration is the preferred process utilized because of the wide range of applications for ultrafiltered water.

Generally accepted definitions in the area are as follows: A membrane filter having a pore size range of from 0.001 to 0.1 microns is used in ultrafiltration. Filters having a pore size greater than 0.1 microns are used in microfiltration and filters having pore size smaller than 0.001 microns are used in hyperfiltration (reverse osmosis) processes. It will of course be understood that there are no precise lines of demarcation among the classes of filters and some overlap of pore size may and frequently will occur.

A point-of-use system producing ultrafiltered water is preferred because of cost/effect considerations and the wide variety of uses of ultrafiltered water. For example, the ultrafiltration process results in a product useful for the upgrading of D.I. (deionized) water for semiconductor rinsing because the product is free of contaminants such as pyrogens, particulates, colloids and high molecular weight organic materials. The ultrafiltration process is useful in may separation applications such as: pre-treatment of water for central D.I. and reverse osmosis systems; depyrogenation of water for chemical and biological laboratories; particulate and pyrogen removal from D.I. water to be used for analytical procedures; production of pyrogen free water for biotechnology and tissue culture; preparation of clinical samples for analysis; concentration of bacterial and mammalian cells; depyrogenation of certain parenteral solutions such as antibiotics, buffers and sugar solutions; and pretreatment of feed water for distillation units to minimize scale buildup and prolong equipment life.

An essential point of this invention is to provide a filtration system including automatic controls for minimizing the possibility for human error. Further, the system includes a control for automatically directing contaminants and a predetermined volume percentage of water from the bottom of the system filter to waste every time the system product valve is opened.

Essential and otherwise known art procedures performed periodically in point-of-use filtration systems of the type under discussion include purge, rinse-up and sanitization. Purging is the controlled flushing of the upstream side of the filter membrane to ensure removal of any accumulated reject materials. Rinse-up refers to controlled, periodic passage of liquid through the filter unit to assure stagnation does not take place within the unit. Sanitization concerns periodic treatment to kill and remove any bacteria in the filter unit.

In the present invention, the procedures just outlined may be performed in various combinations at predetermined intervals so that product liquid or water of acceptable quality is readily available upon demand. Further, one automatic control system of the invention also provides for opening of a filter reject valve every time the system product valve is opened in order to minimize excessive loss of pretreated fluid which occurs with manually operated systems.

SUMMARY OF THE INVENTION

Accordingly, it is a principal object of the invention to provide a point-of-use liquid filtration system and method virtually ensuring provision of acceptable quality product every time the system product valve is opened.

It is an object of the invention to provide a point-of-use liquid filtration system and method which minimizes the possibility of the introduction of human error in providing acceptable quality product.

It is another object of the invention to provide a point-of-use liquid filtration system and method which automatically accomplishes purge, rinse-up or sanitization and various combinations of one or more of these procedures at predetermined intervals without need of manually operated controls as in known prior art systems.

It is a further object of the invention to provide a point-of-use liquid filtration system and automatic controls therefore which are low in cost of manufacture and maintenance and uncomplicated in structure.

Still another object of this invention is to devise an automatic control system which minimizes the loss of expensive pretreated fluid.

BRIEF DESCRIPTION OF THE DRAWINGS

By way of recapitulation, the task of the present invention, simply stated, may accordingly be said to be to provide a point-of-use liquid filtration system minimizing human error in providing acceptable quality product, which system has automatic control means for automatically accomplishing purge, rinse-up or sanitization, essential procedures in such systems, and various combinations of one or more of these procedures at predetermined intervals without need of manually operated controls as in known prior art systems.

Further and more complete objects and advantages of the present invention will become readily apparent by reference to the following detailed specification taken together with the following drawings in which.

DESCRIPTION OF THE PREFERRED EMBODIMENTS

Figure 1:
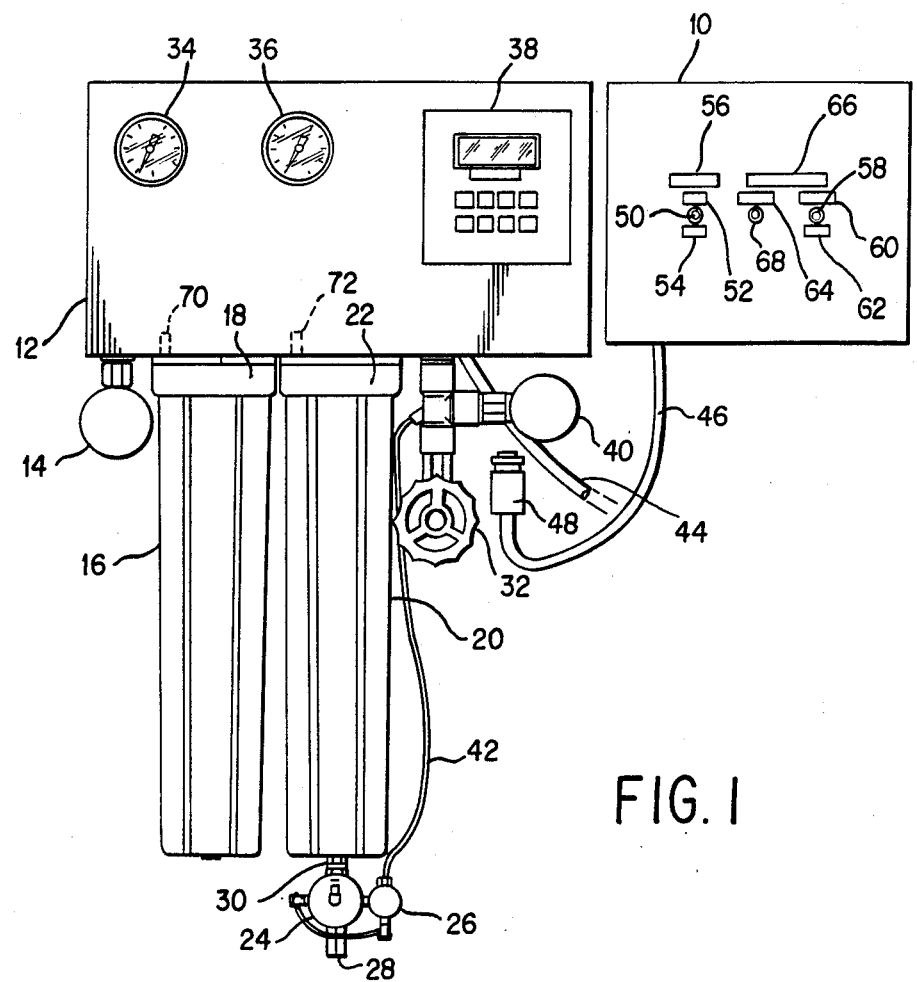
FIG. 1 is an elevation view of a preferred embodiment of the invention.

Referring now to the drawings by reference character, a preferred embodiment of the invention is shown in FIG. 1, including a control box 10 and a cartridge housing unit 12. Both box 10 and unit 12 may be wall mounted by conventional means (not shown) adjacent one another at a selected point of use location. The box 10 and unit 12 are separated to suit customer convenience; one or more of the automatic feature options housed in box 10 may be added to supplement the basic filtration unit housed and supported in unit 12.

With further reference to FIG. 1 and unit 12 at the left hand side of the figure, feed water is piped into the system through a feed water valve 14. From valve 14, water is piped into a prefilter or other optional filter assembly cartridge assembly 16. Normally, assembly 16 includes a cartridge housing threaded into a matingly internally threaded mounting collar 18 located beneath housing 12. When the filter in the housing has served its useful life, it may be replaced by unthreading the housing, replacing the used filter with a fresh one, and rethreading the filter housing into units mounting collar. Again, the provision of a prefilter is optional; the housing of assembly may be left empty, if desired. Types of prefilters that may be used include, by way of example only, a 2.0 micron prefilter cartridge, a mixed bed D.I. cartridge or an organic scavenger cartridge.

After optional prefiltering, the water is piped to a second, ultrafiltration filter cartridge assembly 20 which includes a housing similar to assembly 16 which is removably, threadably received within a second mounting collar 22, depending from housing unit 12. Typically, in a preferred embodiment, the cartridge of assembly 20 is a spiral would ultrafiltration cartridge with a retention rating of 0.005 microns (nominal). In any event, the filter assemblies 16 and 20 form no part of the instant invention per se.

The bottom of filter cartridge assembly 20 includes a purge valve 24 and a reject valve 26 piped in parallel with one another as shown. A waste or drain line fitting is provided at 28 and the valves are conveniently attached to and removed from the bottom of filter assembly 20 by means of a quick disconnect valve located at 30.

Ultrafiltered water is piped from the upper end of ultrafiltration filter cartridge assembly 20 to a manually operated product valve 32.

As is otherwise conventional, housing unit 12 may include a first pressure gauge 34 for monitoring the inlet water pressure from feed valve 14, a second pressure gauge 36 for monitoring the water pressure in the line exiting from the first filter assembly 16, and a resistivity meter assembly with a probe (not shown) for monitoring the electrical resistance of water in a line between the filter assembly 20 and product valve 32.

Just above product valve 32 is interposed a rinse-up bypass valve 40 which directs product to waste or drain when opened, for reasons to be explained below. A pressure control line 42 interconnects product valve 32 and reject valve 26 for reasons appearing below. An electrical umbilical line 44 interconnects control box 10 and housing unit 12.

With further reference to control box 10 shown at the right hand side of FIG. 1, an inlet line 46 for air under pressure with a standard connection fitting to an air source being shown at 48; the function of the air pressure supply will be explained below. External controls and indicators on control box 12 include an automatic rinse-up toggle switch 50 with "ON" and "OFF" labels 52 and 54, respectively, and an "AUTO RINSE-UP" title label 56. To the right of the rinse-up control are the sanitization controls, including a toggle switch 58, an "ADD H2O2" label 60, a "START" label 62, an "IN PROGRESS" label 64 and a "SANITIZATION" label or title label 66. A red indicator lamp 68 will flash when switch 58 is moved to the "ADD $H_2O_2$" switch position and remain on steadily when sanitization is in progress. With reference again to the left hand side of FIG. 1, a pair of otherwise conventional sanitization fluid (e.g., $H_2O_2$) injection ports 70, 72 are located inside the external cover of housing unit 12, one for each filter assembly 16, 20, respectively.

Further details of both rinse-up and sanitization controls and procedures are set forth in greater detail hereinbelow. Again, it should be noted that the provision for automatic operation of these procedures is optional.

Figure 2:
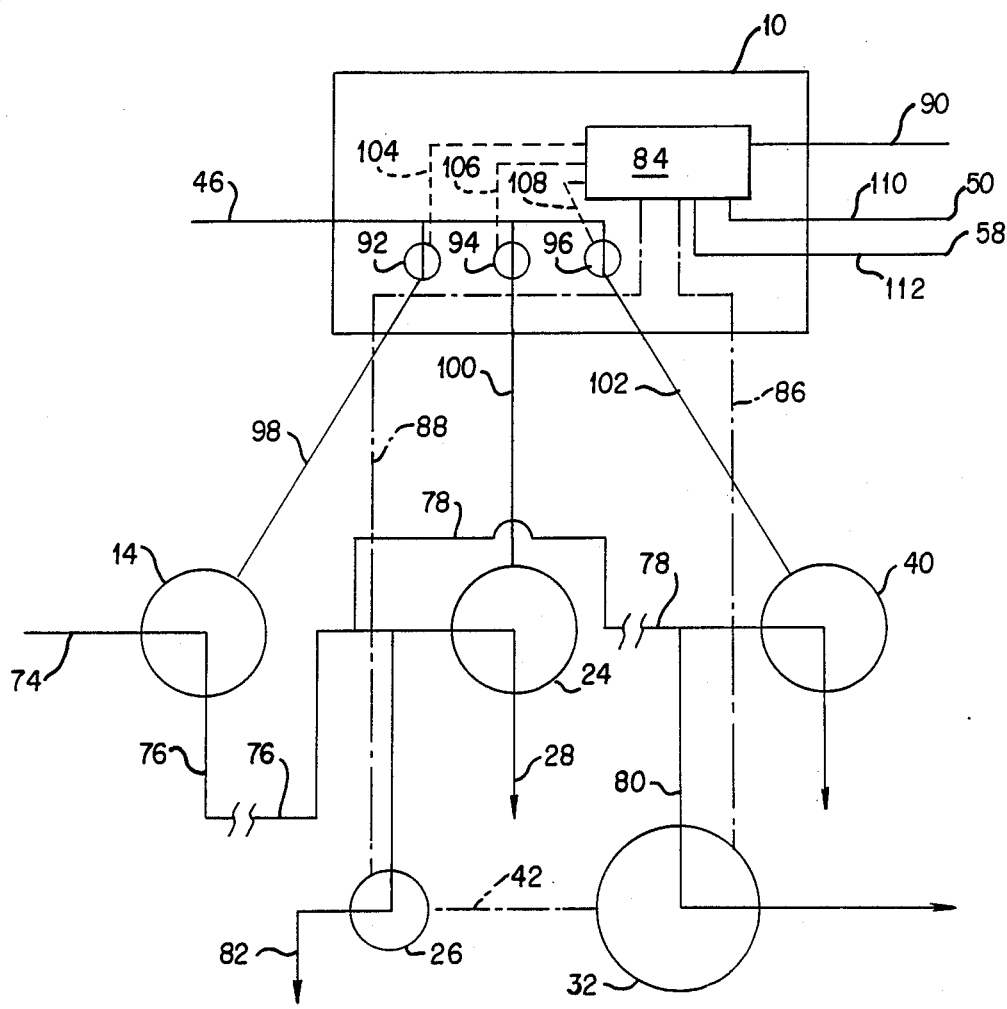
FIG. 2 is an essentially schematic view showing essential components of various automatic controls for the filtration system of the invention.

Referring now to FIG. 2 in conjunction with FIG. 1, the controls for the filtration system will be discussed in relation to the procedures of reject, purge, rinse-up and sanitization. Referring to FIG. 2, inlet line 74 feeds water to be filtered to feed water valve 14 and water exits valve 14 through line 76 whereupon it passes through pressure gauge 34 and filter assembly 16 (this is indicated by the break in line 76 in FIG. 2). Water then enters the upstream side of filter cartridge assembly 20 via line 78 and passes through filter cartridge assembly 20 as indicated by the break in line 78 in FIG. 2. The fully filtered water then passes through line 80 to product valve 32 where it is drawn off.

On the upstream side of filter cartridge assembly 20, purge valve 24 and reject valve 26 are connected in parallel as is clearly shown in FIG. 2. Further, in one embodiment, fluid line 42 interconnects product valve 32 and reject valve 26 which, in this one embodiment being discussed, is a balanced valve. Thus, opening of product valve 32 causes a pressure drop in line 42 which unbalances reject valve 26 and causes it to open. Reject valve 26 is so internally dimensioned that, with product valve 32 open, a predetermined percentage volume of water drains through valve 26 to waste (indicated at 82) and carries with it any contaminants accumulated on the upstream side of filter cartridge assembly 20. In a preferred embodiment, the internal openings of product valve 32 and reject valve 26 are so related that about ten percent by volume of the total water passing through the system is drained through reject valve 26 with the balance of about 90 percent being drawn off the product valve 32.

Obviously, the reject procedure just described is fully automatic and occurs each time valve 32 is opened to draw off product. However, due to customer preference and/or installation requirements, some systems of this invention may not include the reject valve structure and function just described.

In another embodiment of the invention, a reject valve 26 is provided which is electrically controlled. In such case, the control line 42 is eliminated. With reference to the upper portion of FIG. 2, an otherwise conventional microprocessor 84 is mounted interiorally of control box 10. Electrical line 86 connects product valve 32 with microprocessor 84 and line 88 connects microprocessor 84 with reject valve 26. Thus, when product valve 32 is opened, a signal is generated, processed and sent to open reject valve 26. (Of course, a simpler type of electrical control could be provided to cause the opening of reject valve 26 when product valve 32 is opened which need not be described here.)

With further reference to FIG. 2, the additional automatic features of the invention include purge, rinse-up, sanitization, or combinations thereof, e.g., or rinse-up and purge, or rinse-up, purge and sanitization, depending on customer preference. A suitable microprocessor 84 may be chosen from the wide variety currently available and programmed to control functions discussed below. One microprocessor that functions quite satisfactorily is a model Melsec F made by Mitsubishi. Electrical power is supplied to microprocessor 84 from a standard 110 volt AC line indicated at 90.

Air pressure supply line 46 is branched to three electrically operated solenoid valves 92, 94, 96 which control feed water valve 14, purge valve 24 and rinse-up valve 40, respectively. In one embodiment, by way of example only, the valves 92, 94 and 96 are KIP model 0141161 solenoid valves. The two valves 14 and 40 are Plast-O-Matic brand air operated diaphragm valves and purge valve 24 is Polo brand air operated plunger valve. Sizes/catalog numbers depend on the usual factors related to flow parameters and customer installation requirements. Solenoid valve 92, 94 and 96 are connected by air lines 98, 100 and 102 to valves 14, 24 and 40, respectively. Electrical control signals from microprocessor 84 are fed to solenoid valves 92, 94 and 96 via lines 104, 106 and 108, respectively. As can be seen at the upper right hand portion of FIG. 2, rinse-up switch 50 and sanitization switch 58 are electrically connected to microprocessor 84 by lines 110 and 112, respectively.

With the description of structural components of the invention now completed, the automatic features of the control system of the invention will now be discussed. These are three in number: automatic purge; automatic rinse-up and purge; and automatic sanitization, rinse-up and purge.

(1) Automatic Purge

As previously mentioned, periodic purging of the system is necessary to ensure the removal of any accumulated reject material on the upstream side of the filter within filter cartridge assembly 20.

Microprocessor 84 may be programmed to cause purge valve 24 to open for one minute every three hours, by way of example. In a typical installation, it should be noted that product water may still be drawn off product valve 32 during automatic purge except in cases of extremely low incoming line pressure at feed line 46. Additionally, even during automatic purge as described, reject valve 26 will continue to open each time product valve 32 is opened; the operations are independent of one another.

So long as electrical power is supplied at 90 and the inlet feed water valve 14 remains open, automatic periodic purging will continued. Thus, it can be seen that the possibility of operator error is virtually nil.

(2) Automatic Rinse-up and Purge

Rinse-up assures stagnation does not occur within filter cartridge filter assembly 20. The problem is that standing water can lead to an increase in the pyrogen level of product water as well as a decrease in resistivity of the product water. The automatic feature of this invention substantially eliminates the need to run product water to drain for a period of time to ensure any standing and thus possibly degraded water is removed.

The automatic rinse-up feature is activated by moving toggle switch 50 (FIG. 1) to the "ON" position indicated by label 52. Microprocessor 84 may be programmed to open the rinse-up bypass valve 40 for five minutes every hour, for example. So long as feed water valve 14 is open, electrical power is provided at 90, and switch 50 remains in the "ON" position, then the automatic rinse-up feature will continue to function without interruption. Thus, again, the possibility of operator error is minimized.

The automatic purge feature earlier described continues to function independently of the just described rinse-up feature, regardless of the position of the rinse-up toggle switch 50. Of course, the operation of reject valve 26 is also entirely independent of the rinse-up feature and continues to function each time product valve 32 is opened.

Toggle switch 50 is provided because at times it may be desired to shut down the system for an extended period of time; switch 50 will be moved to the "OFF" position indicated by label 54 in order to conserve water.

After such a shutdown, it may be necessary to run water through the system for some time before normal operation can be started anew. During such a shutdown it is ordinarily necessary to protect the system with peroxide, for example, to prevent bacterial growth during a shutdown period.

(3) Automatic Sanitization, Rinse-up and Purge

Sanitization must be performed periodically, usually weekly, to kill and remove bacteria. A sanitization cycle includes the steps of system depressurization, manual injection of an appropriate sanitizing solution (e.g., a 35 percent $H_2O_2$ solution), automatic dilution, sanitization and rinse-up. The microprocessor 84 is programmed so that various functions occur automatically, except for switch 58 operation and the manual injection of $H_2O_2$ solution.

To initiate the sanitization cycle, toggle control switch 58 is moved to the "ADD $H_2O_2$" position indicated by label 60. Red indicator lamp 68 will begin to flash, inlet feed valve 14 closes, and rinse-up valve 40 opens to depressurize the system. Then the cover on housing unit 12 is opened manually to access the injection ports 70 and 72. Sanitization fluid is then injected into assembly 20 by means of a conventional syringe (not shown) through port 72. If a prefilter or optional filter is present in assembly 16, solution is also injected by syringe through port 70.

After injection is completed and the cover of unit 12 is closed, switch 58 is moved momentarily to the "START" position indicated by label 62. This causes inlet feed valve 14 to open and rinse-up valve 40 to remain open for a short period of time so that, for example, the 35 percent $H_2O_2$ solution is diluted to a 1.5 percent solution by incoming water. Thereafter, all valves are automatically closed and a sixteen hour peroxide residence time is initiated to sanitize the system.

At the end of the sixteen hour period, the purge function is automatically initiated; the feed water valve 14 is opened and the dilute peroxide solution is purged through the now opened purge valve 24. Then, one of two events will occur, depending on the position of the rinse-up toggle switch 50. If the switch 50 is in the "ON" position indicated by label 52, the automatic rinse-up procedure described earlier will occur and continue to reoccur as before the sanitization cycle. When product is ready to be drawn from product valve 32 again, the red indicator lamp 68 signals the ready condition by going off.

If switch 50 is in the "OFF" position indicated by label 54, then an automatic rinse-up procedure will continue for twenty minutes and cease. It may be necessary to start the earlier described automatic rinse-up procedure by moving the switch 50 to the "ON" position three or four hours before product water is needed. Alternatively, one may manually rinse-up the system by manually opening valve 40 for about thirty minutes before drawing water from product valve 32.

It must be noted here that when the sanitization cycle is initiated by moving switch 58 to the "ADD H₂O₂" position, the operations of both the earlier described automatic purge and rinse-up features are suspended until the sanitization operation is fully completed as just described above. Thereafter, the automatic purge operation feature is restarted without need of operator intervention.

By now it may have become apparent that an automatic sanitization cycle could be performed over a weekend, conveniently, and left unattended until the following Monday.

Figure 3:
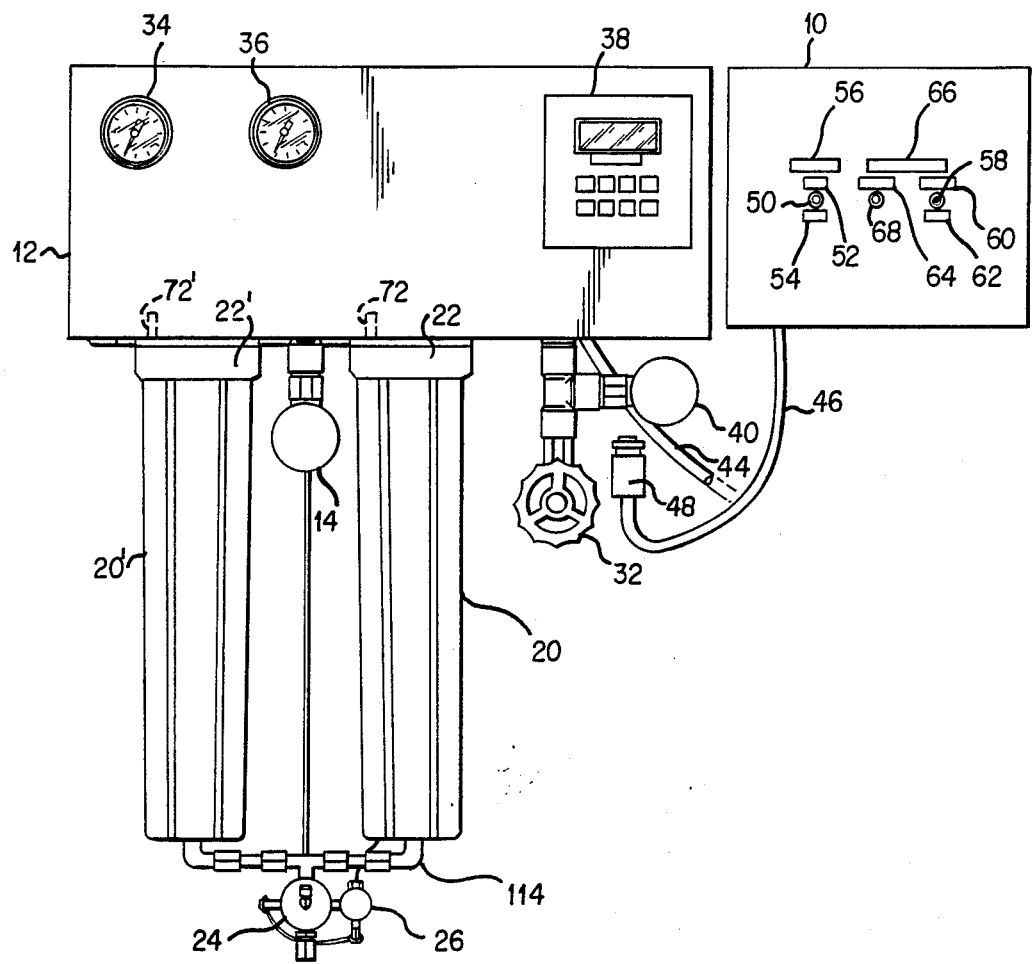
FIG. 3 is an elevation view similar to FIG. 1 and showing another embodiment of the invention.

Referring now to FIG. 3 of the drawings, another embodiment of the invention is illustrated which is identical to the FIG. 1 embodiment earlier describe except for one difference. Instead of a prefilter or optional filter cartridge assembly 16 connected in series with filter cartridge assembly 20, a seconds filter cartridge assembly 20' mounted in collar 22' is provided, and includes an injection port 72'. This assembly is identical in structure and function with filter cartridge assembly 20. Also, the assemblies 20, 20' are connected in parallel rather than in series and the single purge valve 24 is connected to the bottoms of both assemblies 20 and 20' by a drain manifold 114.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A filtration system for producing depyrogenated water comprising:
    a filter cartridge,
    said filter cartridge having an inlet conduit means for charging liquid into said cartridge,
    said inlet means having a drain valve, whereby liquid may be drained therefrom when said drain valve is in the open position,
    said inlet means having a reject valve, whereby liquid may be drained therefrom when said reject valve is in the open position,
    said filter cartridge having an outlet means,
    said outlet means having a product dispensing valve,
    said outlet means having a rinsing valve,
    means for maintaining said water to be dispensed in a depyrogenated condition between periods of non-use of the said system consisting essentially of,
    means for opening said reject valve in response to the opening of said product dispensing valve,
    means for automatically periodically opening said drain valve for a preselected period of time,
    means for opening said rinsing valve for a preselected period of time.

2. The improved filtration system as claimed in claim 1 further comprising at least two of said d filtration cartridges connected in parallel to one another.

3. The improved filtration system as claimed in claim 1 further comprising at least two of said filtration cartridges connected in parallel to one another.

4. The improved filtration system as claimed in claim 1 further comprising at least two of said filtration cartridges connected in parallel to one another.

5. The improved filtration system as claimed in claim 1 further comprising at least two of said filtration cartridges connected in parallel to one another.

6. The improved filtration system as claimed in claim 1 further comprising at least two of said filtration cartridges connected to parallel to one another.

7. The improved filtration system as claimed in claim 1 further comprising at least two of said filtration cartridges connected in parallel to one another.

8. The filtration system of claim 1 wherein said reject valve is fluidly operatively connected to said product dispensing valve whereby said reject valve opens in response to the opening of said product dispensing valve.

9. The filtration system of claim 1 wherein said reject valve is electrically actuated, including electrical means sensing the opening of said product dispensing valve whereupon an electrical signal is transmitted to said electrically actuated reject valve thereby to open said reject valve means and to close said reject valve when said product dispensing valve is closed.

10. The filtration system of claim 1 wherein said reject valve and said drain valve are in parallel fluid flow.

11. The filter system of claim 10 wherein the reject valve and the drain valve operate independently.

12. The filter system of claim 11 including means to measure the electrical resistively of said inflow liquid and means to actuate said drain valve in response to a selected parameter of electrical resistivity.

13. The filter system of claim 1 wherein said product dispensing valve and said rinsing valves are in parallel fluid flow.

14. The filter system of claim 13 wherein said rinsing valve operates independently of said product dispensing valve.

15. The filter system of claim 1 wherein the means for periodically opening said drain valve and means for opening said rinsing valve includes a microprocessor means.

16. The filter system of claim 1 further comprising a prefiltration filter cartridge interposed in series upstream before the inlet means and said filter cartridge.

* * * * *